(12) United States Patent
Chapin

(10) Patent No.: US 6,307,966 B1
(45) Date of Patent: Oct. 23, 2001

(54) 180° ROTATION OF DIGITAL IMAGES WITH CONCURRENT COMPRESSION

(75) Inventor: Robert M. Chapin, Rushville, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/198,785

(22) Filed: Nov. 24, 1998

(51) Int. Cl.[7] .............................. G06K 9/36; G06K 9/46
(52) U.S. Cl. ...................................... 382/232; 382/297
(58) Field of Search ................................... 382/162, 166, 382/175, 232, 293, 296, 297, 306; 348/583; 345/126, 437, 649, 656, 658; 358/1.16

(56) References Cited

U.S. PATENT DOCUMENTS

| | | | |
|---|---|---|---|
| 4,947,344 | * 8/1990 | Hayashi et al. | 345/437 |
| 5,483,354 | * 1/1996 | Kessels et al. | 382/297 |
| 5,572,601 | * 11/1996 | Bloomberg | 382/175 |
| 5,751,865 | * 5/1998 | Micco et al. | 382/296 |
| 6,023,556 | * 2/2000 | Ledgard et al. | 358/1.16 |

* cited by examiner

*Primary Examiner*—Timothy M. Johnson
(74) *Attorney, Agent, or Firm*—Fay, Sharpe, Fagan Minnich & McKee, LLP

(57) ABSTRACT

A method of rotating an input image matrix of pixel data 180° to form an output image matrix of pixel data using a computer. The input image matrix is divided into pre-rotated bands of image pixels. Groups of pixels of a first pre-rotated band are accessed beginning at a bottom end of the first band and ending at a top end of the first band. The order of the pixels within each group of pixels of the first band is then reversed. The groups of reordered pixels are written to a band memory to form a rotated band of pixel data. In the rotated band of pixel data, the order of the groups of pixels of the rotated band is in reverse order to the order of the groups of pixels in the first band. The steps of accessing, reversing, and writing steps are repeated for the other bands of image pixels. Finally, the rotated bands are combined in reverse order of the pre-rotated bands to form the output image matrix. Optionally, the bands are concurrently reordered and compressed. By appropriately selecting the size of the groups of pixels and performing the steps on separate direct memory access masters, the method can take advantage of the bandwidth of high-performance busses to rotate and compress data in real-time.

7 Claims, 3 Drawing Sheets

180° ROTATION OF DIGITAL IMAGES WITH CONCURRENT COMPRESSION

BACKGROUND OF THE INVENTION

The present invention relates to the color imaging arts. It finds particular application in digital color image copiers and will be described with particular reference thereto. It is to be appreciated, however, that the invention is applicable in other digital image processing applications (both color and monochrome) such as digital color scanners, printers, fax machines, plotters and the like, and in other environments and applications.

The generation of color documents can be thought of as a two-step process: first, a color image is generated by scanning an original document with a color image input terminal or scanner or, alternatively, creating a color image on a work station operated in accordance with a color image creation program; and second, printing the color image with a color printer in accordance with the colors defined by the scanner or computer generated image.

In a scanner, a color document is scanned line by line to acquire a full image of the document. The full image is represented as a two-dimensional data set of pixel information. The data set consists of line data in one dimension and column data in the other dimension. Due to the rastering motion of the particular input device in the scanner, a line of data is acquired relatively quickly. In contradistinction, each column of data, which is perpendicular to the line of data, is acquired relatively slowly. Accordingly, the axis of the image or acquired data set that is parallel to each line of data is called the fast-scan direction. Analogously, the axis of the image or acquired data set that is parallel to each column of data is called the slow-scan direction.

Scanner output is commonly transformed to a color space of tristimulus values, i.e., RGB (red-green-blue). Usually, these values are linearly transformed into standard XYZ coordinates of CIE color space, or a corrected transform of those values. An example of a CIE color space is the luminance-chrominance space termed CIE 1976 L*a*b* (CIELAB), where L* is lightness value, a* is a redness-greenness value, and b* is a yellowness-blueness value. These tristimulus values, which are essentially defined at the user interface, are independent of any particular device. Accordingly, the tristimulus information is referred to as being "device independent".

Printers have an output which can be defined as existing in a color space called CMYK which stands for Cyan, Magenta, Yellow, and Key or black. The CMYK color space is uniquely defined for the printer by its capabilities and colorants. Printers operate by the addition of multiple layers of ink or colorants. The response of a printer tends to be relatively non-linear. These colors are defined for a particular device, and accordingly, reference is made to the information as being "device dependent". While a printer receives information in a device-independent color space, it must convert that information to print in a device-dependent color space, which reflects the gamut or possible range of colors of the printer.

In a digital color copier having both a scanner and a printer, it is often desirable to electronically rotate an inputted image 180° before printing. However, such rotation provides many memory resource and allocation problems.

In a conventional method of 180° rotation, a dedicated contiguous page buffer must be created to store the rotated image data. To perform the rotation, the first pixel of line 1 of the data is transferred to the last pixel of the last line of the page buffer. Then, the second pixel of line one is transferred to the second to last pixel of the last line of the page buffer. The process is continued until last pixel of the last line is transferred to the first pixel of line 1 of the page buffer. The process is done by random addressing to memory which does not allow direct memory access (DMA) bursting in multi-master bus structures. To create the rotated image, a user must wait until the last pixel is read and written into the page buffer. Because of this, all operations must be done in an uncompressed format. Compression may be done only after the rotated image is written to the page buffer. On a 11×17 inch image at 1200×600 pixels, over 16.0 Megabytes of contiguous memory space must be dedicated as a page buffer. This is a major problem for software management of video memory in digital image processing system. Further, conventional rotation requires complicated page buffer address algorithms.

The present invention provides a new and improved method and apparatus for rotating a digital image which overcomes the above-referenced problems and others.

SUMMARY OF THE INVENTION

In accordance with one aspect of the present invention, a method of rotating an input image matrix of pixel data 180° to form an output image matrix of pixel data using a computer is provided. The input image matrix is divided into pre-rotated bands of image pixels. Groups of pixels of a first pre-rotated band are accessed beginning at a bottom end of the first band and ending at a top end of the first band. The order of the pixels within each group of pixels of the first band is then reversed. The groups of reordered pixels are written to a band memory to form a rotated band of pixel data. In the rotated band of pixel data, the order of the groups of pixels of the rotated band is in reverse order to the order of the groups of pixels in the first band. The steps of accessing, reversing, and writing steps are repeated for the other bands of image pixels. Finally, the rotated bands are combined in reverse order of the pre-rotated bands to form the output image matrix.

In accordance with another aspect of the present invention, an apparatus for electronically an input image matrix having pixel data rotating 180° to form an output image matrix of pixel data is provided. A loopback master sequentially accesses groups of pixels of a plurality of bands of the input image matrix. The loopback master begins at a lower end and ends at an upper end of each of the plurality of bands. The plurality of bands has a sequential order beginning at a top of the image matrix and extending to a bottom of the image matrix. A reorder buffer reverses the order of each of the accessed groups of pixels. A post-rotation memory receives each of the bands of reordered pixel data. A band order memory stores a reverse sequential order of the bands of reordered pixel data. A master accesses each of the bands in the post-rotation memory based on the reverse sequential order stored in the band order memory to form the output image matrix.

In accordance with a more limited aspect of the invention, a compression engine receives groups of reordered pixels from the reorder buffer and compresses the groups of pixels before they are stored in the post-rotation memory.

One advantage of the present invention is that it takes advantage of the bandwidth of high-performance busses in direct memory access systems to rotate and compress data in real-time.

Another advantage of the present invention is that it involves less data processing than other means of rotation.

Yet another advantage of the present invention is that it allows memory management software to work within its desired constructs.

Another advantage of the present invention is that it minimizes memory use and storage space.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF THE PREFERRED EMBODIMENT

Figure 1:
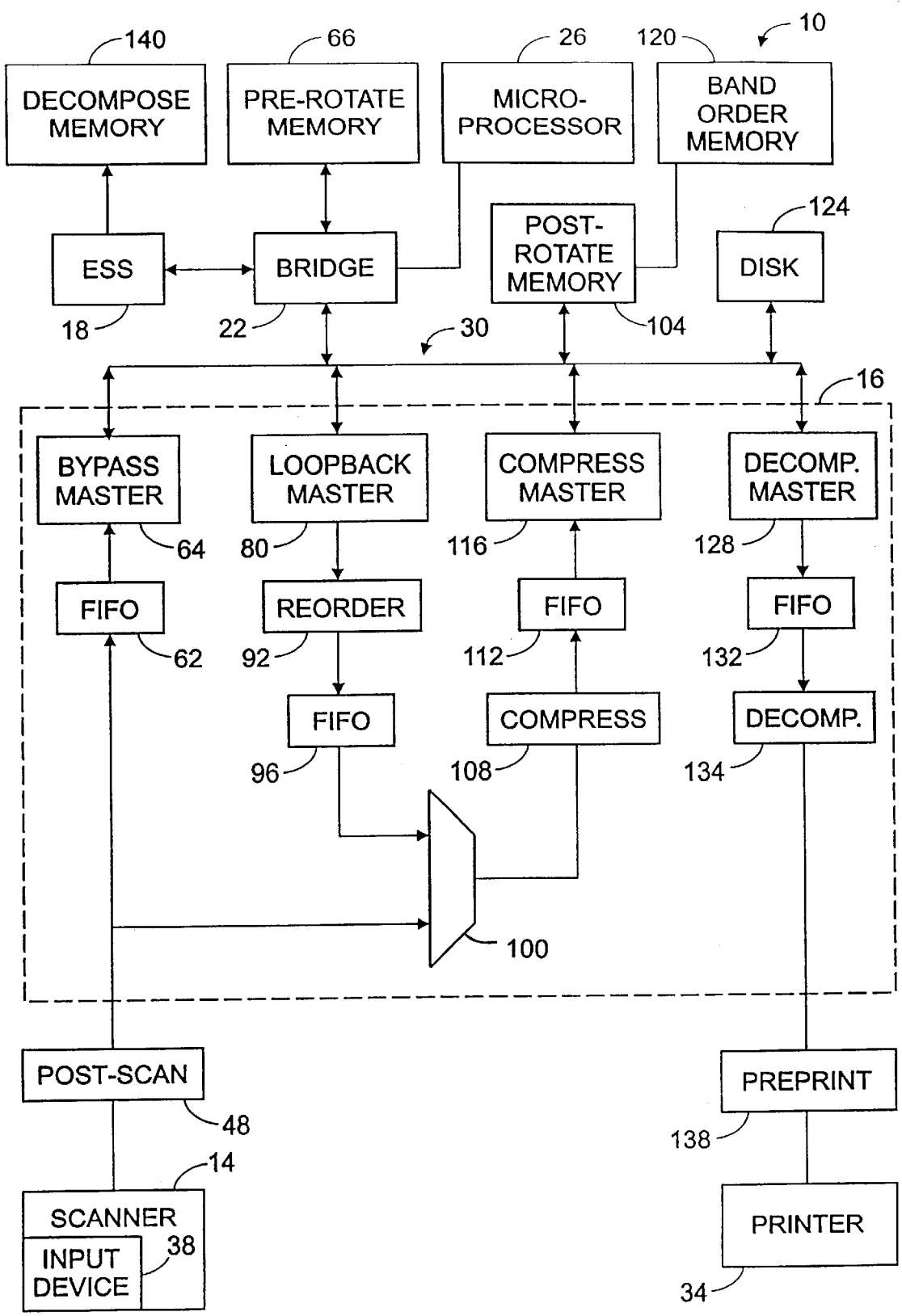
FIG. 1 illustrates a preferred embodiment of a digital color scan/print system which scans an input image and then rotates, stores, and prints an output image therefrom in accordance with the present invention.
Figure 3:
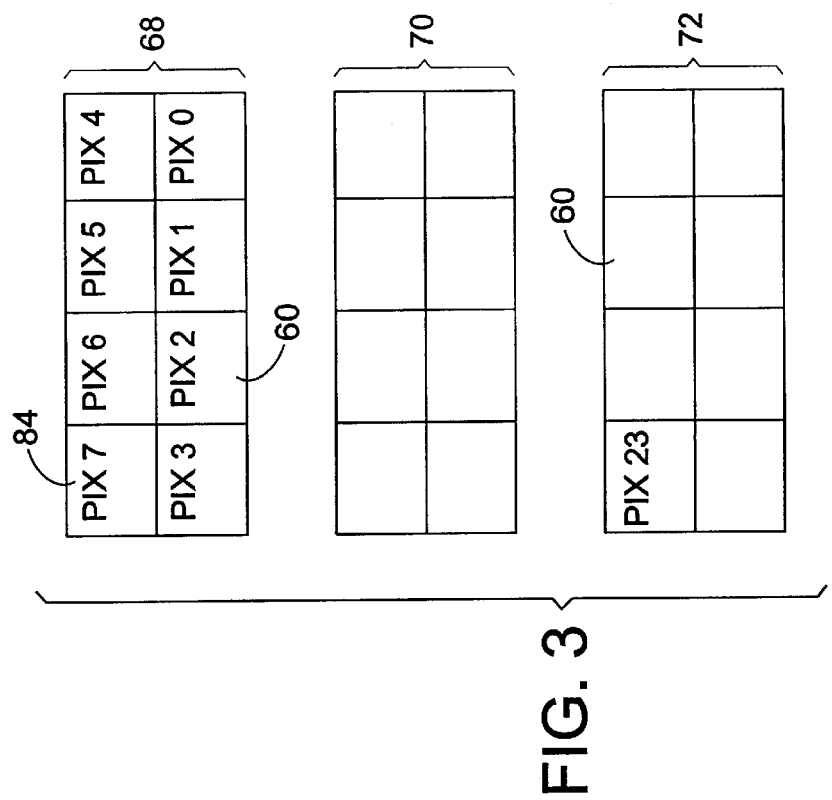
FIG. 3 illustrates the input image matrix after it has been separated into bands and after the pixels in each of the bands have been rotated 180° in accordance with the present invention.

With reference to FIG. 1, an exemplary system for carrying out the present invention is a digital color scan/print system 10, e.g., a digital color copier. The system uses peripheral component interconnect (PCI) architecture and a multi-master bus structure for performing direct memory access (DMA) on multiple individual channels. However, it is to be appreciated that other computer architectures may be used to implement the invention.

The system includes a scanner 14, an image processing applied specific integrated circuit (ASIC) 16, an electronic subsystem (ESS) 18, a bridge 22, a microprocessor 26, and a PCI-based video bus 30, and a printer 34. The image processing ASIC performs 180° rotation of image data.

Figure 2:
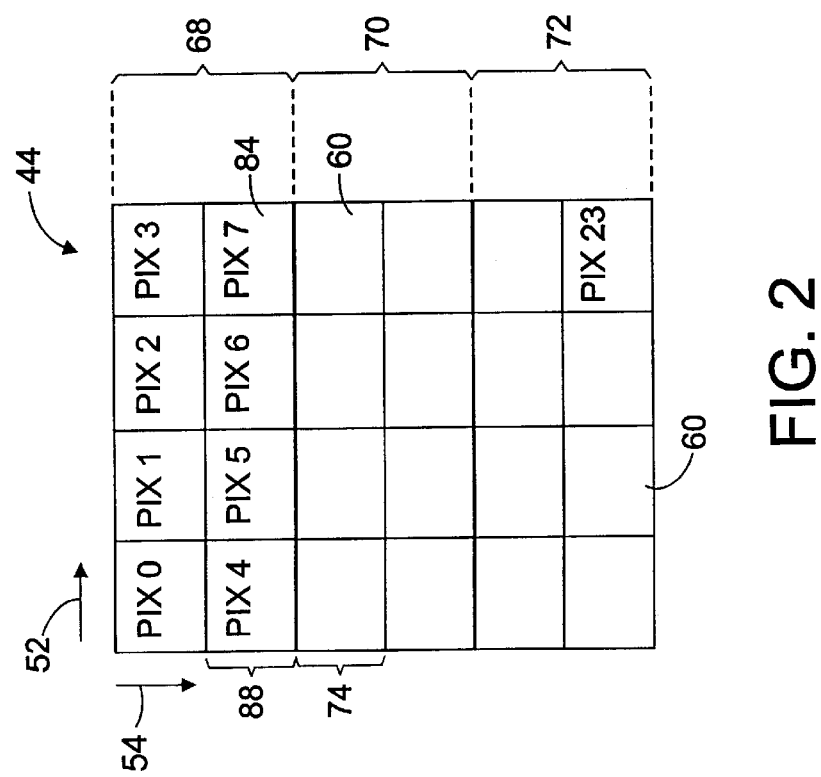
FIG. 2 illustrates an input image matrix.

With reference to FIGS. 1 and 2, the scanner includes an input device 38 which scans a hard copy document 44 and converts it into digital form. The scanner is calibrated to produce a set of digital colorimetric or device independent data describing a scanned image, which, by definition can be defined in terms of the colorimetric RGB space.

A post-scanning processor 48 transforms the RGB color space data into L*a*b* color space data. The RGB data has a fast-scan direction 52 and a slow-scan direction 54. The transformation is performed for each pixel 60 of acquired RGB data using techniques known to the those of ordinary skill in the art. Optionally, either no color-space transformation may be performed or transformation between other color spaces may be performed.

Further, optionally, the post-scanning processor may subsample the L*a*b* data to create pixel data on 32 bit boundaries or words. This generally allows more efficient processing of the image data as DMA based systems typically operate on 32 bit words. In subsampled L*a*b* data, two L*a*b* pixels are represented by the original two L* values and one averaged a* value and one averaged b* value. That is, the original two a* values are simply averaged to one a* value. Analogously, the original two b* values are simply averaged to one b* value. Thus, after subsampling, a 32 bit word represents 2 pixels.

A first first-in-first-out (FIFO) buffer 62 temporarily stores the post-scanned image data. A bypass master 64 accesses the data in the FIFO buffer by DMA and writes it into a video or pre-rotation memory 66.

With reference to FIGS. 1 and 2, the bypass master is programmed to divide up the image data into bands 68, 70, 72. For ease of illustration, the image data from the document 44 is represented as an array of 6 scanlines 74, each of 4 pixels. Accordingly, each band includes 2 scanlines. The first band 68 has eight pixels, the first pixel denoted as Pix 0 and the last denoted as Pix 7.

It is to be appreciated that other dimensions of the image data and of the bands may be used with the present invention. Preferably, the band size is equal to a pre-determined video block size that the system uses. Further, the band size is preferably a plurality of full scanlines, i.e., the band size does not include partial scanlines.

In addition, the band sizes may be decreased as the end of the imaged is reached. This may be done by double buffering address and band size registers in the bypass master. Decreasing band size towards the end of the image would allow rotation of the image to finish shortly after the image data is scanned in. This will be better understood after reading the description below.

Figure 5:
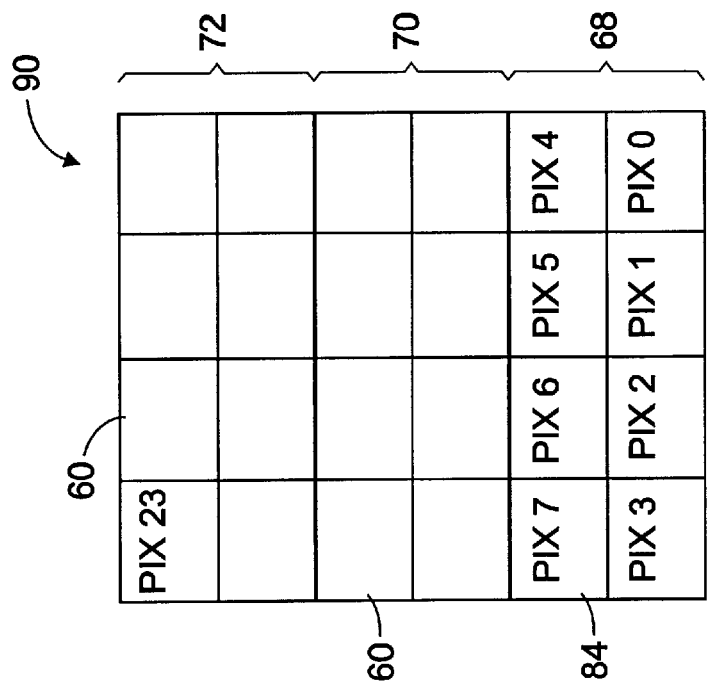
FIG. 5 illustrates an output image matrix which is a 180° rotation of the input image matrix of FIG. 2.

With reference to FIGS. 1–5, once the entire first band is stored in the pre-rotation memory, rotation begins. Instrumental in the rotation is a separate DMA channel or loopback master 80 which accesses the band data that is stored in the pre-rotation memory. Preferably, the image processor ASIC 16 has a dedicated channel for the loopback master. The loopback master points to the group of pixels which includes the last location 84 of the first band, i.e., Pixel 7 in FIG. 2. After rotation, which is more fully described below, the exemplary input matrix of data 44 (FIG. 2) is rotated 180° to form exemplary rotated output data 90 (FIG. 5).

Under the control of a DMA controller associated with the loopback master, the loopback master reads a group of pixels beginning at the end of the band. In the present example, the DMA controller accesses 4 pixels or bytes at a time, i.e., a word. Accordingly, the DMA controller points to the address location of the last four pixels of the first band 68 (FIG. 2). Then, the controller reads pixels 4, 5, 6, and 7. In the present example, this is an entire scanline 88, which includes Pix 4 to Pix 7 84. The word is buffered in a reordering buffer 92 where the pixels are reversed in order, i.e., they are reordered to be last-in-first-out. In other words, the last byte of the last word of the burst, i.e., Pixel 7 84 of FIG. 2, is stored or addressed as the first pixel out, i.e., Pixel 7 84 of FIG. 2. This word or group of pixels then becomes the first 4 pixels or first scan line 68 of FIG. 3. Once the DMA controller has finished the reordering, the DMA controller decrements its address counter instead of a standard increment and repeats the preceding steps with a next group of pixels, i.e., Pix 0–3.

In a larger band, this accessing of a group of pixels, last-in-first-out re-ordering of the pixels, moving backwards in the band to access a next group of pixels, re-ordering of these pixels, etc., is continued for the entire first band. When completed, the first band 68 is effectively reversed in order or rotated by 180° (see FIGS. 2 and 3). A second FIFO buffer 96 temporarily stores the reordered band data 68 (FIG. 3) before it passes through a multiplexer 100.

With reference to FIG. 1, because the DMA controller associated with the loopback master is reading from the end of the band, the output created is properly ordered to be written contiguously to a post-rotation memory 104. Thus, random addressing is unnecessary, which allows the output to be compressed before being written to the post-rotation memory.

Accordingly, after the multiplexer, a compressor engine 108 compresses the re-ordered data band. A third FIFO buffer 112 temporarily stores the compressed, reordered band data. Another dedicated DMA channel or compression master 116 reads the band data from the third FIFO buffer and writes it to the post-rotation memory 104. It is to be appreciated by those skilled in the art that additional processors or processing steps may be added or omitted to give the options of storing the image data either subsampled or non-subsampled in either a compressed or uncompressed format.

When the first band is fully in memory, the same process as just described is repeated for the second band of data 70. Similarly, the process is repeated with the third band of data 72. The rotation of the bands will always be one band behind the video input source, which, in this case, is the scanner.

Figure 4:
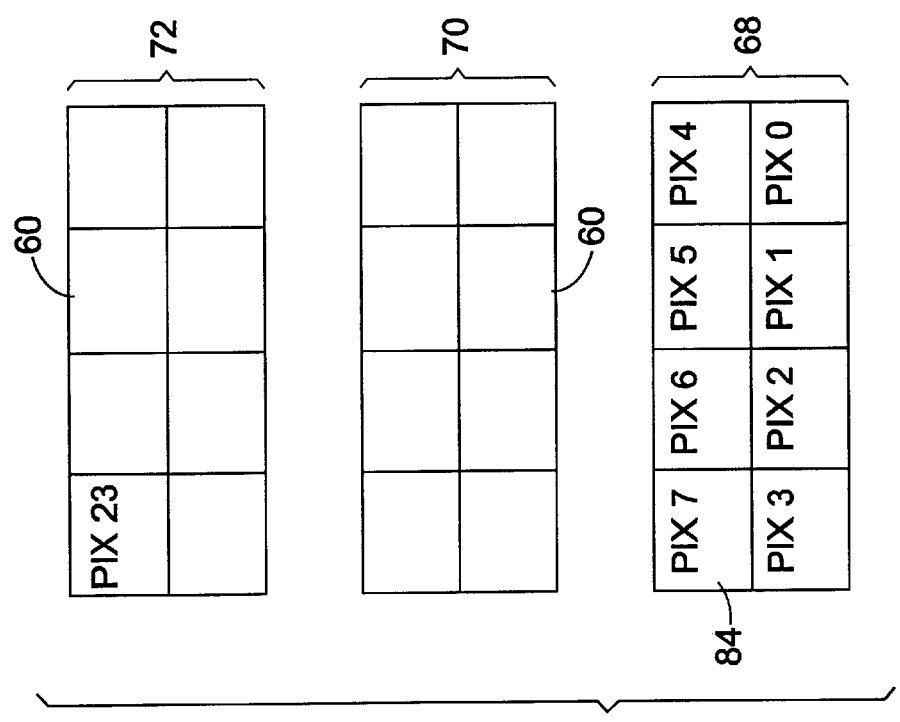
FIG. 4 illustrates the image matrix after the order of the bands has been reordered 180° in accordance with the present invention.

With reference to FIGS. 1, 4 and 5, memory management software, symbolized as a band order memory 120, keeps track of the compressed rotated bands. In the present invention, it is unnecessary to combine the bands 68, 70, 72 (FIG. 4) in the post-rotation memory to form a complete 180° rotated image 90 (FIG. 5) in the post-rotation memory. Rather, the band ordering is done at print time.

Optionally, tags or image descriptors are associated with each pixel of the input data to provide for segmentation of the image. In such case, after the input data is rotated, the tags are passed through the image processor. This rotates the tag information so that it is relevant to the pixel input data. If the memory resource is available, the image processor includes a separate channel to allow concurrent tag rotation.

With reference to FIG. 1, the rotated compressed image data is stored in the post-rotation memory until print time. For longer term storage, the rotated compressed image data is transferred to a hard disk 124.

At print time, a decompressor master 128 in accesses the data by DMA and writes it to a fourth FIFO buffer 132 for temporary storage. Then, the data is decompressed by a decompression engine 134.

With reference to FIGS. 1 and 5, a pre-print processor 138 receives the decompressed data or L*a*b* data, filters it, and transforms it into CMYK values more appropriate for printing. Further, the pre-print processor performs conversion resolution, rendering, and the like prior to printing the rotated image 90 on the printer 34. Alternatively, the rotated image can be displayed on a monitor, transferred over a network, or the like.

One of the advantages of the present invention is that the rotated data can be compressed so that there is no need for a large post-rotation page buffer or memory. For example, an 11×17 inch document at 1200×600 spots per inch requires a 16.5 Megabyte page buffer for conventional rotation. In the present invention, if bands of 200,000 bytes are created and these bands are compressed at a ratio of 20 to 1, the total memory needed for the same document is only about 1.2 Megabytes. That is, 800,000 bytes of memory for the compressed rotated bands and a two band buffer of 200,000 bytes each.

Another advantage of the present invention is that bandwidth performance is increased by up to 800%. This is mostly due to the elimination of random addressing which forces the video interface bus structure to do single word transfers. Burst sizes for the DMA controller can now be selected for optimal performance.

In the previously described embodiment, an image was scanned, rotated, and printed. With reference to FIG. 1, optionally, a decomposed image from the ESS 18 is rotated. Decomposers or decomposer software associated with the ESS, such as ADOBE, build up bit or byte maps in bands. First, the decomposer creates the byte map in bands (68 70 72 of FIG. 3) in ESS decompose memory 140. The image processor ASIC 16 has the ability to point to the ESS decompose memory and DMA each of the bands through the bridge 22. As soon as a band is finished being passed through the bridge, the loopback master 80 reverse DMAs the band, the reorder buffer 92 reverses the band, and the compression engine 108 compresses the band as described earlier. The compression master 116 then DMAs the band and writes it to memory 104. Alternatively, the memory destination may be ESS decompose memory or other local video memory that resides on the video bus structure. Because the rotation is always one band behind the decomposer, a small latency depending on the band size will be seen from decomposer finishing and the image being totally rotated.

The invention has been described with reference to the preferred embodiment. obviously, modifications and alterations will occur to others upon a reading and understanding of this specification. It is intended to include all such modifications and alterations insofar as they come within the scope of the appended claims or the equivalents thereof.

Having thus described the preferred embodiment, the invention is now claimed to be:

1. An apparatus for electronically rotating an input image matrix having pixel data 180° to form an output image matrix of pixel data, the apparatus comprising:

a loopback master for sequentially accessing groups of pixels of a plurality of bands of the input image matrix, the loopback master beginning at a lower end and ending at an upper end of each of the plurality of bands, the plurality of bands having a sequential order beginning at a top of the image matrix and extending to a bottom of the image matrix;

a reorder buffer for reversing the order of each of the accessed groups of pixels;

a post-rotation memory for receiving each of the bands of reordered pixel data;

a band order memory for storing a reverse sequential order of the bands of reordered pixel data; and a master for accessing each of the bands in the post-rotation memory based on the reverse sequential order stored in the band order memory to form the output image matrix.

2. The apparatus as set forth in claim 1 wherein the apparatus is connected to one of a digital scanner, a digital printer, a digital copier, and a digital computer data network.

3. The apparatus as set forth in claim 1 further comprising a compression engine for receiving groups of recorded pixels from the reorder buffer and compressing the groups of pixels before they are stored in the post-rotation memory.

4. The apparatus as set forth in claim 1 further comprising a decompression engine for receiving, compressed groups of reordered pixels from the reorder buffer and decompressing the groups of pixels.

5. The apparatus as set forth in claim 1 wherein the loopback master includes a direct memory access controller that is decremented while sequentially accessing groups of pixels.

6. The apparatus as set forth in claim 1 wherein the loopback master includes a direct memory access processor.

7. The apparatus as set forth in claim 1 further comprising one of a peripheral component interconnect video bus and a multi-master bus structure.

* * * * *